(12) United States Patent
Körner et al.

(10) Patent No.: US 7,131,929 B2
(45) Date of Patent: Nov. 7, 2006

(54) TRANSMISSION MODULE

(75) Inventors: Tillman Körner, Zang (DE); Iris Knoblauch, Böhmenkirch (DE); Marco Toneatto, Heidenheim (DE); Hans-Peter Eubler, Heidenheim (DE); Heiko Neuwirth, Steinheim (DE); Alexander Körner, Steinhelm (DE); Joachim Hellmich, Freising (DE)

(73) Assignee: Voith Turbo GmbH & Co. KG, Heidenheim (DE)

(*) Notice: Subject to any disclaimer, the term of this patent is extended or adjusted under 35 U.S.C. 154(b) by 116 days.

(21) Appl. No.: 10/477,287

(22) PCT Filed: May 13, 2002

(86) PCT No.: PCT/EP02/05223

§ 371 (c)(1),
(2), (4) Date: Jul. 23, 2004

(87) PCT Pub. No.: WO02/093041

PCT Pub. Date: Nov. 21, 2002

(65) Prior Publication Data

US 2004/0248693 A1 Dec. 9, 2004

(30) Foreign Application Priority Data

May 12, 2001 (DE) .................. 101 23 194

(51) Int. Cl.
*F16H 57/08* (2006.01)
(52) U.S. Cl. ..................................... 475/331
(58) Field of Classification Search .............. 74/606 R; 475/331, 269
See application file for complete search history.

(56) References Cited

U.S. PATENT DOCUMENTS

| | | | |
|---|---|---|---|
| 4,041,807 A | 8/1977 | Herr | 74/752 C |
| 4,308,763 A | 1/1982 | Brisabois | 74/700 |
| 4,738,159 A | 4/1988 | Kato et al. | 74/606 R |
| 4,817,462 A * | 4/1989 | Dach et al. | 475/56 |
| 5,122,104 A * | 6/1992 | Ohkubo | 475/291 |
| 5,404,772 A | 4/1995 | Jester | 74/606 R |
| 5,662,007 A | 9/1997 | Starker et al. | 74/606 A |
| 6,231,467 B1 | 5/2001 | Korner et al. | 475/113 |
| 6,685,593 B1 * | 2/2004 | Meier-Burkamp et al. | 475/35 |

FOREIGN PATENT DOCUMENTS

| | | |
|---|---|---|
| DE | 197 10 931 | 10/1997 |
| DE | 19710931 | 10/1997 |

(Continued)

OTHER PUBLICATIONS

Roesch, R. et al.: "Elektrohydraulische Steurung Und Aeussere Schaltung Des Automaticsen Getriebes W5A 330/580 Von Mercedes-Benz", Atx Automobiltechnische Zeitshrift, Franckh 'Sche Verlagshandlung, Stuttgart, Germany Bd. 97, NR. 10, pp. 698-700, Oct. 1995.

(Continued)

*Primary Examiner*—Dirk Wright
(74) *Attorney, Agent, or Firm*—Baker & Daniels

(57) ABSTRACT

A modular transmission system for the production of a plurality of modular transmission units that are modified for different applications purposes, comprising a transmission input and transmission output a power transmitting element comprising a mechanical transmission part that is arranged in a housing part and that forms with the latter a basic transmission module that includes at least one input and one output, and a control and supply unit integrated into the basic transmission module. The logic, control and supply units are arranged beneath the power transmitting element of the basic transmission module.

19 Claims, 10 Drawing Sheets

FOREIGN PATENT DOCUMENTS

| | | |
|---|---|---|
| DE | 198 09 467 | 9/1999 |
| DE | 198 09 472 | 9/1999 |
| DE | 19809472 | 9/1999 |
| DE | 199 50 967 | 5/2001 |
| EP | 1 054 192 | 11/2000 |
| WO | WO01/29454 | 5/2001 |

OTHER PUBLICATIONS

DeVos, G.W. et al.: "*Migration of Powertrain Electronics to On-Engine and On-Transmission. The General Trend for the Mounting Location of Powertrain Electronics Reflects a Migration From Passenger and Engine Compartments to On-Engine and On-Transmission, While Offering Potential System-Level Benefits, There Are Challenges*", Automotive Engineering International, SAE International, Bd, 107, Nr. 9, Sep. 1999.

Jurgen Pickard : "*Planetengetriebe in Automatischen Fahrzeuggetrieben*", Automoniel-Industrie, Nr. 4, p. 41-48, 1979.

Roesch, R. et al.: "*Elektrohydraulische Steurung Und Aeussere Schaltung Des Automatiscen Getriebes W5A 330/580 Von Mercedes-Benz*", Atx Automobiltechnische Zeitschrift, Franckh'Sche Verlagshandlung, Stuttgart, Germany Bd. 97, Nr. 10, pp. 698-700, Oct. 1995.

Beitz, W. u. Kuttner, K.H. (Hrsg): *Dubbel/Taschenbuch für den Maschinbau*, 17, Aufl, Berlin, 1990,pp. F 22-23.

\* cited by examiner

Fig.4a
Fig.4b
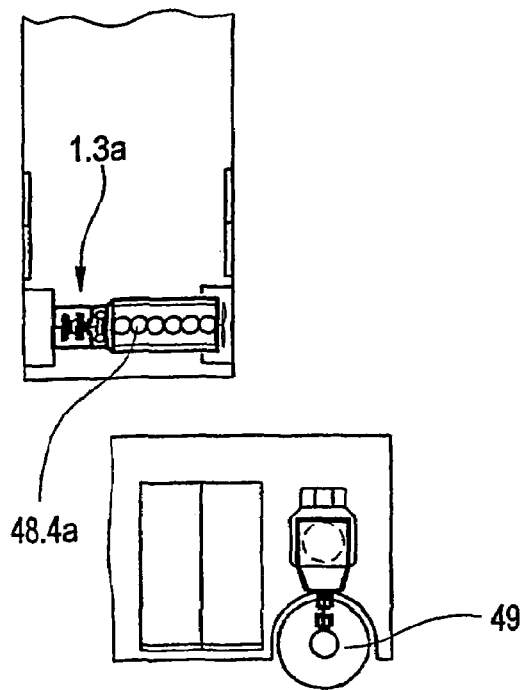
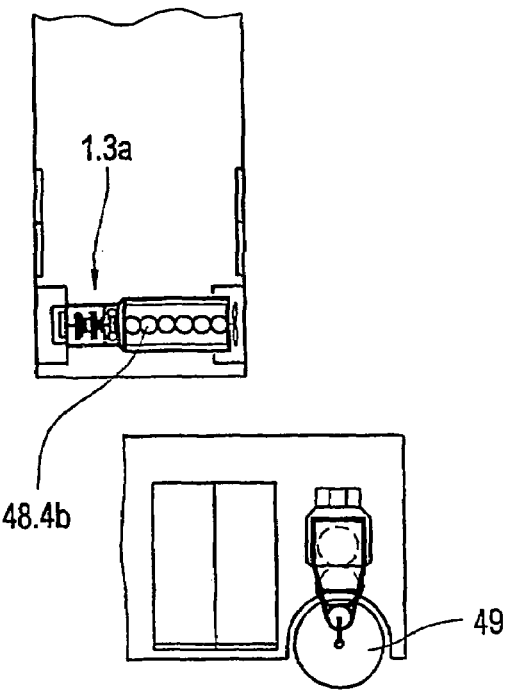
Fig.4c
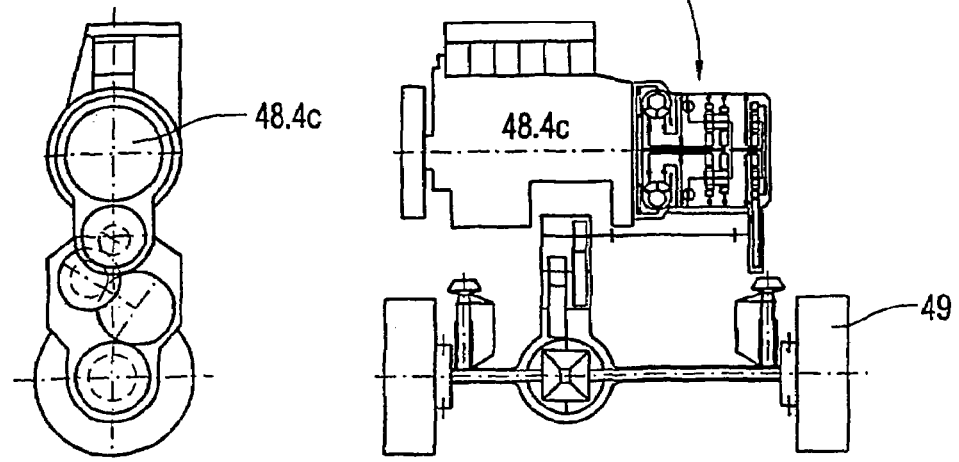

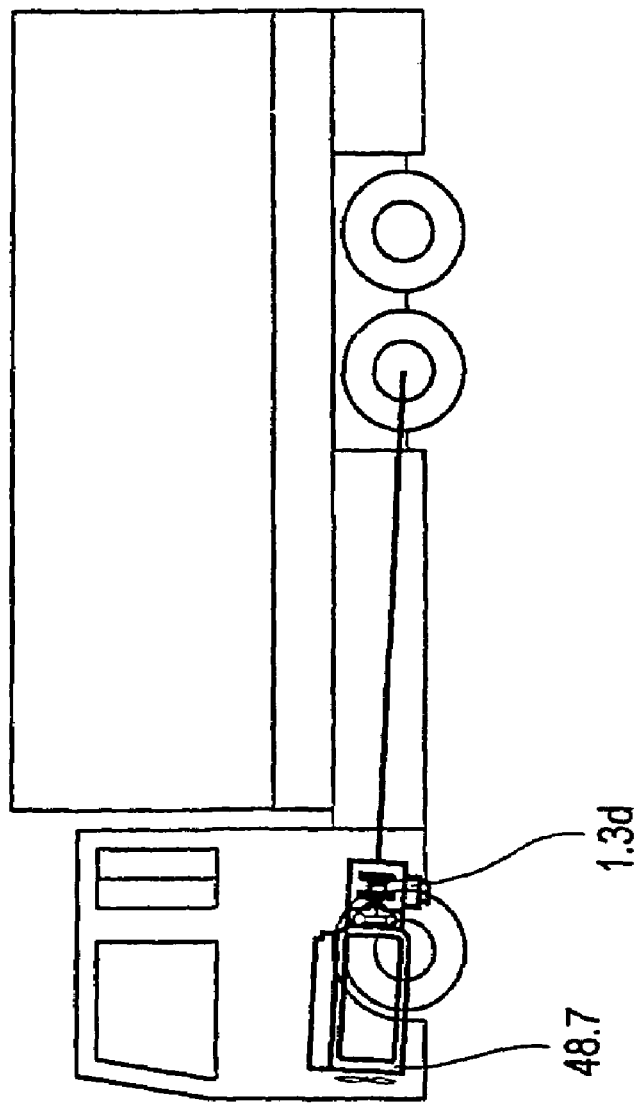

TRANSMISSION MODULE

BACKGROUND OF THE INVENTION

The invention relates to a transmission modular system.

Transmission modular units are known in a multitude of designs for various purposes. As representatives, reference is made to the following:

Juergen Pickard: "Planetary transmission in automatic vehicle transmissions", Automobilindustrie 4/79, Pages 41 through 48

To do justice to a broad spectrum of applications, increasingly transmission modules or transmission modular systems are being developed. Such a transmission module is known from the cited state of the art, Page 47. This transmission module allows the assembly of multi-speed transmissions. The transmission module comprises thereby the individual structural components of hydrodynamic transmission elements in the form of a hydrodynamic speed/torque converter, a hydrodynamic retarder, a front-mounted range-change unit, a basic transmission module in the form of a main transmission for realization of 3 speeds and a rear transmission case. Only the hydrodynamic speed/torque converter and the main transmission for three gears and the gear control and the rear transmission case are used to realize a 3-speed transmission. With additional provision of a retarder it is arranged between the hydrodynamic speed/torque converter and the basic transmission module. For the 4-speed and 6-speed transmission a front-mounted unit is added in each case. With all of them the transmission control is arranged on the transmission case of the 3-speed main transmission.

While this solution does make it possible to put together different manual transmission concepts for different applications, vertically separated modular units are however required for implementation, e.g. planetary wheel planes and the retarder level. In addition, to realize the required electrical connections, for example of the electrical connection between sensors and the ECU as well as of the ECU and the actuators a multitude of plug connections and lead-in lines are to be provided in the above named modular units. The basic transmission and the sensor system cannot be inspected separately. In each case a transmission cover is always required, since in said cover a part of the sensors or other function elements is always contained. In addition, a simple interchangeability of the sensor system in the total transmission, i.e. 3-speed, 4-speed or 6-speed transmission for the hydraulic control devices as well as the sensor system is not possible without further ado, without taking the transmission module apart.

SUMMARY OF THE INVENTION

Therefore the invention is based on the object of creating a transmission module system including a majority of transmission modular units, particularly compound transmission modular units in such a way that using the same modules with little expenditure and maintaining a high degree of standardization transmission modular units can be created for a multitude of different purposes. The individual modular unit of the module itself should be mechanically convertible without having to adjust sensors, actuators, ECU, cabling. The prefabrication, i.e. the number of production steps until the final test and the performance of maintenance steps using simple personnel should be reduced.

The invention's solution is characterized by the features of Claim 1. Advantageous refinements are set forth in the dependent claims.

With the invention's transmission module system for creating a majority of modified transmission modular units for different purposes with one transmission inlet and at least one transmission outlet a basic transmission module is common to all transmission modular units, which is identical for all transmission modular units and includes an inlet and an outlet. The basic transmission module can be combined with any transmission modular unit using additional add-on or auxiliary modules.

The basic transmission module comprises a mechanical transmission part, which contains the power-transferring components, for example planetary gear trains etc. and which is enclosed by a transmission case part. The mechanical transmission part with the case part form basic transmission modules, which can be locked by a locking unit comprising at least one further case part element. Along with the power-transferring components the basic transmission module further comprises at least one logic unit, a supply unit and/or additional function units, which can be addressed together as control and supply module. According to the invention the logic and control unit is integrated in the case of the basic transmission module and arranged below the power-transferring components, i.e. flanged at a specified minimum distance from the outer periphery of the power-transferring elements or on the case part of the basic transmission module. In accordance with the invention the supply unit is also assigned to the basis transmission module. Said supply unit comprises components of an operating fluid and/or lubricant and/or control supply system, further also in this regard required add-on units such as heat exchangers, cooling device, pumps, valves etc. The supply unit is also integrated in the case part of the basic transmission module underneath the power-transferring elements.

By logic unit the entirety of electronic control devices is understood, particularly ECU, detection devices, that is sensors and setting devices, as well as coupling with them. By control and supply unit the hydraulic control as well as components of the operating fluid and/or control and/or lubricant system are understood.

The hydraulic supply chain, that is the oil suction, gear pump, filter, lubrication, oil filling mechanism for the converter and retarder, heat exchanger, control blocks etc. and closed circuits can therewith be formed in the control and supply module separated from the power-transferring elements in the basic transmission module. By means of the invention's solution a spatial combination of individual components occurs according to their basic function, for one the logic and control and supply units and for another the power-conducting elements upon simultaneous formation of a horizontal borderline between these elements. Several tasks are solved by means of the arrangement. Therewith during constant execution of the basic transmission module various logic and control and supply units can be allocated to said basic transmission module. Further the basic transmission module can, by means of combination with add-on modules in the form of so-called adapter and auxiliary modules, be diversified into a multitude of transmission units. By consolidating the logic unit and the control and supply unit into one module each they can be easily randomly combined with each other. This makes it possible in simple fashion to create a model series whereby the basic transmission module can be built for itself and the control and supply module as well as the logic module can be built from stockpile and the transmission modular unit, particularly a compound transmission, can be supplemented at a potential later point in time as per application requirements with the adapter and auxiliary modules. The basic transmission module with logic and control and supply unit is additionally inspectable by itself, so that the time-consuming putting together of the whole transmission modular unit for testing purposes is no longer necessary. This feature of stand-alone inspectability is made possible by means of the separation of the power-conducting functions and non-power-conducting functions in horizontally separate units in the basic transmission module. Then only a final inspection has to be performed when the entire compound transmission is assembled according to customer specifications.

By basic transmission module a basic transmission is understood, which in combination with different drive units and outputs can be used for a multitude of differently designed transmission units, whereby the modifications consist only in the end piece and the drive unit, particularly in the selection of the drive elements.

The basic transmission module contains the power-transferring elements of the mechanical transmission part and of the case. This can be combined with corresponding control and supply modules.

By power-conducting elements are understood all power-transferring elements, including the elements changing the speed/torque. Included among these are for example, with transmission designs with Ravigneaux-type gear, the planetary gear trains and the switch elements necessary for realization of different gear steps. The logic module is formed by a logic unit, a control block (control-slider case, solenoid valves), the control and supply module of the hydraulic control and supply units, gear pumps and filter. The logic unit or units as a rule comprise an electronic control device. The control and supply unit comprises a hydraulic or pneumatic control device. The electronic control device comprises additionally at least one electronic controller, whereby a control unit or a unit made up of electronic and electrical components is understood by this, to which the required variables for controlling the transmission modular unit are supplied and processed inside of, and which outputs the set variables formed by the input variables corresponding to the desired drive operation. The controller comprises as a rule a majority of electric and electronic components, which are allocated to each other corresponding to the processing of the input variables to be performed and are coupled with each other. Preferably a majority of the electronic and/or electric components are jointly arranged on at least one carrier plate and are enclosed by a controller case. The electronic control device comprises, in addition to the controller, devices for recording the input variables and means for coupling the devices with the controller, further it comprises means for coupling with the corresponding setting elements for activation of the setting devices, which are allocated to the individual transmission elements of the transmission modular unit for changing the function or operation. Since the setting devices in the form of actuators can also be a component of hydraulic control devices, these means for coupling can be allocated both to the electronic control device as well as the hydraulic control device. By hydraulic control device, those hydraulic connections between the recording means of the input variables and/or the electronic control device and the setting devices are understood, which as a rule are hydraulically pressurized and the elements acting as actuators and their couplings with the setting elements. Included in this are essentially all required elements for actuating or setting the individual gear steps By supply unit, those devices are understood which in the supply system provide the transmission modular unit with operating fluid for the hydrodynamic transmission part, lubricants for the mechanical transmission part and the bearings, control means for controlling the setting devices. This includes for example pump devices and filter devices integrated in the supply system. By function units, those devices are understood that are allocated to the other two units—logic unit or supply unit, but which do not assume primary functions only in these units, for example cooling devices etc.

From a further aspect of the invention the mechanical power-transferring transmission part, which forms the basic transmission module, comprises at least power-transfer elements, with which at lest three gear steps can be realized. For adaptation to different requirements, rear-mounted steps and/or central power take-offs and angle drives are integrable in the connection unit. For realization of a compound transmission a rear-mounted step in the form of a range-change unit is rear-mounted in the unit. This range-change unit makes possible the operation of the transmission configuration created in this way as a 3-speed, 4-speed, 5-speed and 6-speed transmission by corresponding control of the individual transmission elements. The output occurs coaxially or parallel to the transmission input shaft without additional means for realization of a central power take-off or an angle drive.

In a particularly advantageous design of the basic transmission module and therewith the mechanical transmission part this comprises two planetary wheel planes for realization of three gear steps, whereby both are coupled with each other and use a common element, preferably in the form of the bridge, whereby said bridge simultaneously forms the outlet of the basic transmission module. In the formation of the closing unit as a simple cover element without possibility of integrating further power-transferring elements the compound transmission is designed as a 3-speed transmission. The integration of the rear-mounted step into the closing unit, in combination with the two planetary wheel planes of the basic transmission module makes possible a very compact overall transmission modular unit for examples of application in which the operating range should be covered by at least four to six gears.

The means for realization of a central power take-off or of an angle drive are integrated either in the 3-speed version in the closing unit alone or in the case of a rear-mounted step being provided after said rear-mounted step in the closing unit, whereby the output of the angle drive forms the output of the transmission modular unit and therewith the transmission outlet.

There are a multitude of possibilities for the spatial arrangement of the individual elements in the logic module and the control and supply module. Particularly the spatial arrangement of the electronic control device and of the hydraulic control device can take place corresponding to one of the following named models:

a) arrangement of hydraulic control device and electronic controller or electronic control device in horizontal direction side by side and considered in vertical direction, flush, i.e. without displacement;

b) arrangement of the hydraulic control device and of the electronic controller or control device in horizontal direction side by side and offset in vertical direction to each other;

c) arrangement one above the other.

Preferably each of the control devices or controllers has its own corresponding carrier element allocated to it, which can be connected to each other into a carrier device, so that a modular unit, comprising at least the electronic controller and the hydraulic controller, is formed. Said modular unit can in simple fashion be removed in its entirety from the control and supply module. A further option consists in arranging both—the electronic controller of the electronic control device and hydraulic control device—on a common central carrier element and likewise forming a modular unit. In both cases the entire modular unit is referred to as carrier element or carrier elements, hydraulic control device and electronic controller as control platform, which can be offered as a usable modular unit.

From a further aspect of the invention, the arrangement of logic units, control and supply units and function units takes place considered in fitting position at a height which lies in the area of the height of the operating fluid, lubricant or control fluid sump in the transmission. From a further aspect of the invention the electronic control device has a case allocated to it, which preferably is constructed as sealed against hydraulic fluid, for example oil and/or another fluid. The controller can then be directly arranged in the operating fluid, control fluid and/or lubricant sump of the transmission modular unit. As a result of this the possibility additionally exists of exposing the electrical and electronic components of the controller to at least indirect cooling by means of the operating fluid in the operating fluid, control fluid and/or lubricant sump or by means of the cooling devices, heat exchangers etc. arranged there. The oiltight design of the case causes, however, for realization of the electrical bond between the controller and the sensors of the control device required for recording the variables at least indirectly characterizing the current driving condition and/or wishes of the driver and/or further marginal conditions and the actuators controlled by means of the control device for activation of the individual elements of the transmission modular unit, for example for realization of the gear change of the switch elements or the setting devices of the switch elements and/or for presetting of input variables by means of a overriding control or regulation device, a correspondingly designed execution or preferably only docking, for example to a transmission socket at the oil pan.

The arrangement of the controller in fitting position in the lower area of the transmission modular unit and the provision of a corresponding case make it possible to arrange the sensors for recording the individual variables at least indirectly describing the operation of the individual elements of the transmission modular unit at a specified time likewise in the area underneath the transmission center line which corresponds to the axis of rotation and therewith makes it possible to design the entire control device including the sensor system and actuator system relatively compactly. The arrangement in the operating fluid, control fluid and/or lubricant sump, which as a rule is collected in a so-called oil pan, which is formed by the bottom part of the transmission case, in the present case of the case element of the body transmission, makes it possible additionally to remove the control device complete with the related control hydraulics, the actuator system for operation of the individual switch elements and the sensors as well as the supply devices, elements, filters etc. which as a rule are arranged on the case of the oil pan in simple fashion and test them separately as a whole of operating ability possibly additionally under specified predefinable conditions.

The creation of the transmission module occurs using the basic transmission unit by combination with different drive units for example in the form of a hydrodynamic transmission part and the possibility of different design of the closing units. The single transmission modular units thus ordered differ from each other with constant mechanical transmission part solely in the design of the drive units and the closing units, whereby this is essentially for the application case and the requirements attached to the application case as well as possibly the logic and control and supply units.

The power-transferring transmission part, which also forms the basic transmission module, as well as the control and supply module combined with it form thereby a basic transmission for a transmission component, whereby the individual units—basic transmission module and logic module as well as control and supply module—can be manufactured separately and only have to combined with each other as modules. Particularly the easy exchangeability made possible by means of the horizontal separation between the power-conducting parts in the basic transmission and the control and supply units is thereby of advantage. For example, the individual components of the basic transmission module and logic as well as control and supply units can be selected as the smallest common unit. Proceeding from the basic transmission module different drive units can be provided for different purposes and further also different outputs, for example central power take-offs or angle drives. This is realized by means of combination with the further adaptation and auxiliary modules the drive unit and closing element. The case of the drive unit and closing element together with the case part element of the basic transmission module form the total transmission case. From a further aspect of the invention it is also possible to integrate the drive unit in the basic transmission module proceeding from a basic transmission module, that is particularly for the case in which the same drive element or the same configuration of the drive unit can be used. In this case the adaptation to the most different output circumstances takes place via the corresponding design of the closing element, particularly as a rear-mounted range-change unit with or in the form of a central power take-off or angle drive.

BRIEF DESCRIPTION OF THE DRAWINGS

The solution of the invention is explained in the following in detail using figures. The figures show the following:

FIGS. 4a through 4d show in diagrammatically simplified representation examples of application for transmission modular units as per FIG. 3a;

FIG. 7 illustrates in diagramatically simplified representation an example of application of a transmission modular unit as per FIG. 3e.

DETAILED DESCRIPTION

Figure 1:
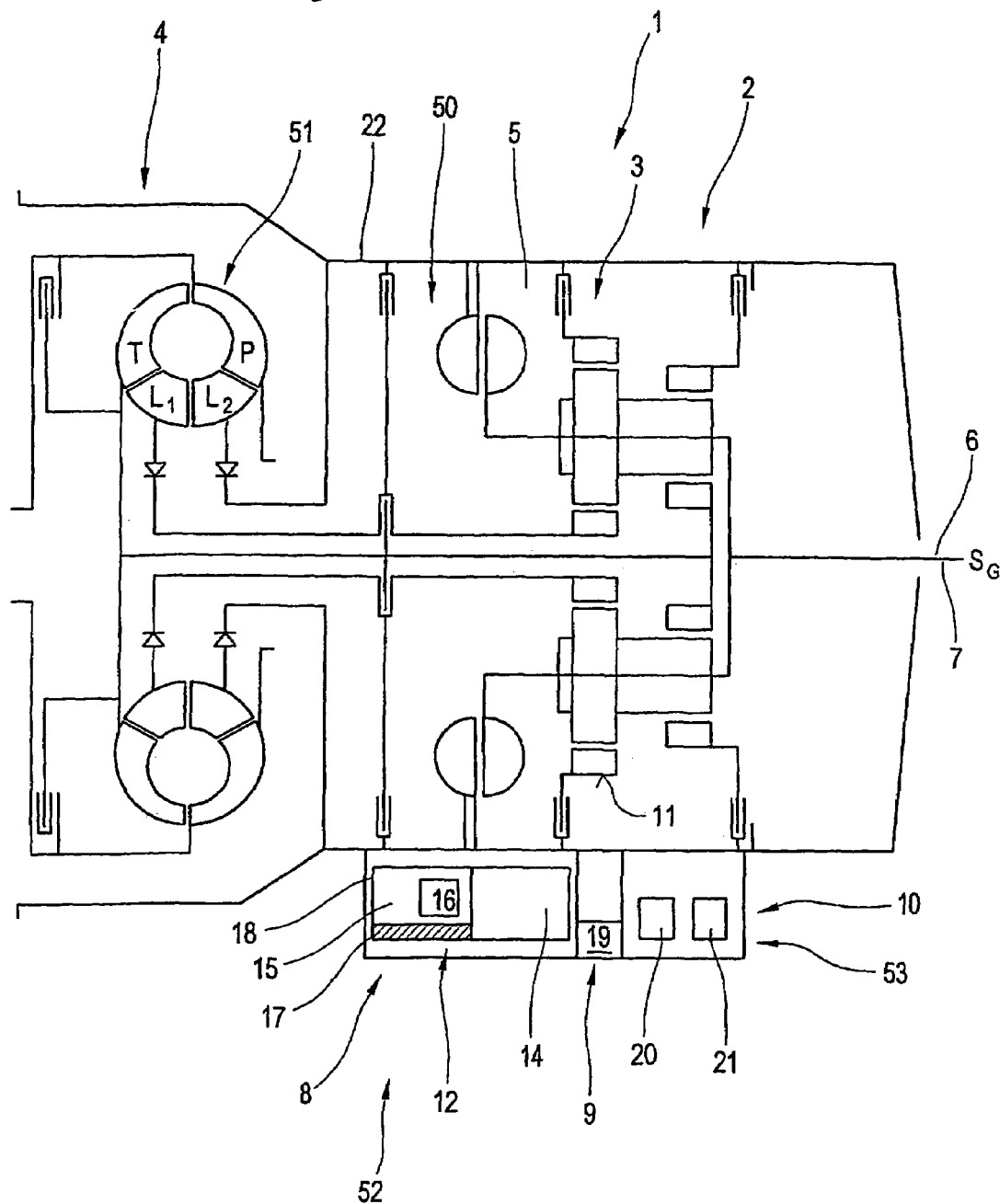
FIG. 1 illustrates in diagrammatically simplified representation the basic principle of the utilization of a basic transmission module designed according to the invention in a compound transmission unit with a drive unit in the form a converter, the basic transmission module and logic, control and supply module in compact design.

FIG. 1 illustrates in diagramatically simplified representation the basic principle of the invention's transmission module system in the form of a basic transmission module 5 in compact fashion in a complete transmission modular unit 1. In the case of the transmission modular units it is a matter preferably of compound transmissions 2, which comprise at least one mechanical transmission part 3, which is coupled with a drive unit 51 in the form of a hydrodynamic transmission part or a hydrostatic transmission part 4. The basic version of the combination 50 out of basic transmission module 5 and drive unit 51 in the form of a hydrodynamic transmission part 4 represents a version for realization of at least three gear steps. The related mechanical transmission parts 3 and the hydrodynamic transmission part 4 or the hydrostatic transmission part are combined into one structural unit out of a basic transmission module 5 and drive unit 51. The basic transmission module 5 has an outlet 6 which can be coupled with the power-transferring elements, which can be combined with the basic transmission module 5 for ensuring further additional functions. As per the invention all logic units and control and supply units 9 as well as the related function units 10 for example in the form of a logic and control module or supply module 53 are integrated in the basic transmission module 5. These form together with the basic transmission module 5 a platform transmission 50. The arrangement of the logic units 8, the control and supply units 9 as well as the function units 10 allocated to them takes place underneath the power-transferring elements of the mechanical transmission part 3, i.e. essentially underneath the extension of a theoretical connection axis by means of the inlet and outlet 6 of the basic transmission module and at a distance to the outer periphery of the power-transferring elements, which is designated here with 11. The minimum dimension for the distance to be observed is to be selected in such a way that the operation of the power-transferring elements of the basic transmission module 5 is not impaired. The logic units 8 comprise thereby function elements for control and regulation tasks. Belonging to the logic or control units 8 for example are a control device 12 allocated to the transmission modular unit 1 or the compound transmission 2, including at least one controller 13, whereby the term controller 13 is essentially to be understood as a control device, for example ECU, while the term control device 12 considers both the inlets and outlets of the controller 13 as well as the coupling options with sensors and actuators as well as the connection leads. The control device 12 comprises at least an electronic control device 15. The hydraulic control device 14 is a component of the control and supply unit 9. The electronic control device 15 comprises thereby an electronic controller 16, which is understood as a unit of electrical and electronic components, which supplies the required variables for controlling the transmission modular unit 1, particularly the compound transmission 2, and are processed in said transmission modular unit, and which outputs the set variables formed from the input variables corresponding to the desired drive operation. The electronic controller 16 comprises as a rule a majority of electrical and electronic components which are allocated to each other and coupled with one another corresponding to the processing of the input variables to be performed. Preferably a majority of the electrical and/or electronic components are jointly arranged on at least one carrier plate 17 and are preferably enclosed by a controller case 18. Thereby the possibility exists that the carrier plate 17 is completely integrated in the controller case 18 or forms at least a partial wall area of the controller case 18. Along with the controller 16 the electronic control device 15 comprises devices for recording the initial variables and means for coupling the devices with the controller 16, further means for coupling with the corresponding setting elements for activating the setting devices, which are allocated to individual transmission elements of the transmission modular unit, particularly of the mechanical transmission part 3 and the hydrodynamic transmission part 4 for changing the function and/or operation. Since the setting devices in the form of actuators can also be components of the hydraulic control device 14, the means for coupling can then be allocated both to the electronic as well as also the hydraulic control device 14. By hydraulic control device 14 are understood the hydraulic connections between the recording means of an initial variable and/or the electronic control device 15 and the setting devices, which as a rule can be hydraulically pressurized and the elements acting as actuators and their coupling with the setting devices. Included in this term are essentially all elements necessary to activate for activation or setting of the individual gear steps on transmission modular unit 1 or on the compound transmission 2.

The control and supply unit 9 further comprises the elements which for example are used for preparation and supplying of pressure media to the setting devices of the transmission elements. Among these are for example pump devices 19 as well as connection leads for conduction of the pressure media. Subsumed under function units 10 are those elements which are allocated to the individual units logic unit 8 or supply unit 9 and fulfill an additional function that is not primarily only underlying these units, or have a separate function. Among these are included for example filter devices 20, heat exchangers 21.

According to the invention the arrangement of the elements of the logic unit 8, the control and supply unit 9 as well as function units 10 occurs separately from the power-transferring elements of the transmission modular unit, i.e. the mechanical and hydraulic transmission part, whereby the arrangement preferably occurs underneath the axis of symmetry $S_G$ of the power-transferring elements or always at a specified distance a to the outer periphery 11 of the power-transferring elements.

The basic transmission module 5 thus formed, which is designed for realization of at least three gear steps, thereby forms a separate basic transmission modular unit, which is inspectable as a separate modular unit, whereby the case part 23 does not necessarily have to be sealed off. The basic principle of the solution of the invention lies thereby in the spatial combination of the individual according to their basic function, particularly the combination of the power-transferring elements as well as the logic and supply units upon simultaneous formation of a horizontal border line between them. Preferably the arrangement of the logic unit 8, of the control and supply unit 9 and of the function unit 10 occurs in fitting position at the height of or underneath the oil volume level. In addition to the advantage of an increased reliability, since the number and length of the cable connections required for electrical coupling by means of integration of the electronic control device 15 in the case 22 of the transmission modular unit compared to conventional solutions is considerably lower, this solution offers the possibility of individual synchronization of the control device to each transmission modular unit, without having to perform a reprogramming of the controller in the exchange of essential power-transferring elements of the total transmission modular unit 1 and therewith a change of the configuration of the transmission modular unit. The unique allocation of transmission modular unit and electronic control device makes possible a simplification of the production logistics. The structural integration of the electronic control device 15 and the hydraulic control device 14 makes it possible to create an inspectable unit of control device, control hydraulics, actuator system and sensor system of the transmission modular unit 1, whereby the control device 15 is already adaptable to the transmission-specific tolerances during the inspection operation. The arrangement underneath the transmission axis of symmetry or underneath or next to the exterior circumference of the power-transferring elements offers the advantage that the electronic and hydraulic control devices are easily accessible and exchangeable.

Regarding the spatial arrangement of hydraulic control device 14 and electronic control device 15 there are a multitude of possibilities not described in detail here. The following are conceivable
a) an arrangement of hydraulic control device 14 and electronic control device 15 or at least of electronic controller 16 in horizontal direction side by side and considered in vertical direction flush, i.e. without displacement;
b) an arrangement of hydraulic control device 14 and electronic controller 16 or of electronic control device 15 in horizontal direction side by side and in vertical direction offset to each other;
c) arrangement considered in horizontal direction one above the other.

Preferably each of the control devices or controllers— electronic controller 16 or electronic control device 15 and hydraulic control device 14, not shown here, however, has a corresponding carrier element allocated to it, which can be connected to each other into a carrier device, so that a modular unit, comprising at least the electronic controller 16 and the hydraulic control device 14, can be formed. Said modular unit can in simple fashion be removed in its entirety from the transmission modular unit.

Figure 2:
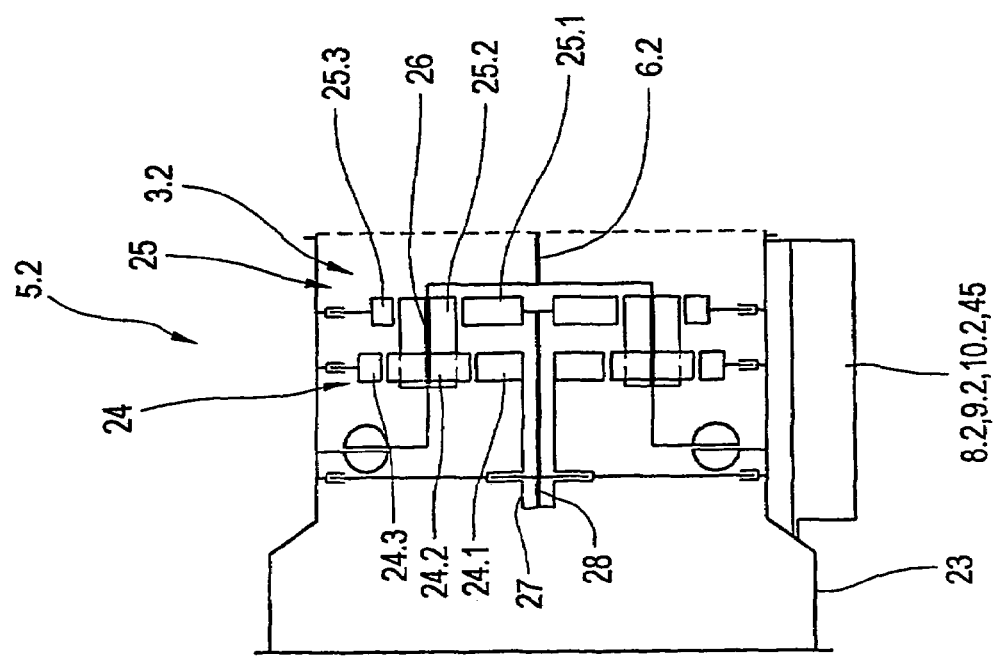
FIG. 2 illustrates an advantageous development of a basic transmission module with logic, control and supply module for use in a platform concept in accordance with the invention.

FIG. 2 illustrates in diagrammatically simplified representation a potential of a basic transmission module 5.2. Said basic transmission module comprises a mechanical transmission part 3.2, which is enclosed by a case 23. The case 23 is designed so that it holds at least the mechanical transmission part 3.2, preferably however additionally also the add-on modules 55 in the form of a hydraulic or hydrodynamic transmission part 4, not shown here. The mechanical transmission part 3.2 comprises in the represented case two planetary gear trains, a first planetary gear train 24 and a second planetary gear train 25. Each planetary gear train comprises a sun gear, the planetary gear train 24 has sun gear 24.1, planetary gear train 25 has sun gear 25.1, planetary gears and an internal ring gear. For planetary gear train 24 the planetary gears are designated 24.2 and the internal ring gear is designated as 24.3. In analogy this designation was also performed for planetary gear 25.2 and internal ring gear 25.3 of planetary gear train 25. Planetary gears 24.2 and 25.2 of the individual planetary gear trains 24 and 25 are mechanically coupled with each other, by means of a joint bridge 26. The bridge 26 forms the outlet 6.2 of the basic transmission module 5.2 and simultaneously of the resulting platform transmission 50.2. Both sun gears are connected by means of a shaft with the transmission input not shown here of transmission modular unit 1. The shafts are designated here by 27 and 28. Shafts 27 and 28 form the inlets of the basic transmission module 5.2. Said shafts are at least indirectly coupled with the transmission inlet of the total transmission modular unit or support themselves in corresponding manner on an element of the total transmission modular unit. Further integrated in basic transmission module 5.2 underneath the power-transferring elements, particularly planetary gear trains 24 and 25, are logic unit 8.2, the control and supply unit 9.2 and the function units 10.2, here all combined into a so-called control and supply module 45, which can be detachably connected with the case of the basic transmission module 5.2.

FIGS. 3a through 3e illustration the realization of different total transmission modular units 1.3a through 1.3e from a basic transmission module as per FIG. 2 and logic units 8 and control and supply units 9, preferably combined into control and supply module 53. Each of the transmission modular units 1.3a through 1.3e comprises a basic transmission module 5.2, which preferably is equally constructed and dimensioned for all the different transmission modular units 1.3a through 1.3e, for example as shown in FIG. 2. Further transmission modular units 1.3a through 1.3e have an add-on module in the form of a drive unit 52.3 in the form of a hydrodynamic transmission part 4.3a through 4.3e, which comprises a hydrodynamic speed/torque converter 29, whereby the hydrodynamic speed/torque converter preferably is also uniformly designed with regard to the structure and the dimensioning. For adaptation to different requirements however, there is also the possibility of allocating different add-on modules to the basic transmission module 5.3 in the form of speed/torque converter 29. To guarantee the adaptation of the transmission modular units 1.3a through 1.3e to different marginal conditions, depending on the requirements, an additional add-on module 56 comprising rear-mounted steps 30.3a through 30.3e and/or output units 31 is allocated.

From a further aspect of the invention as per the developments in FIGS. 3a through 3e the control and supply module 53 formed from the control and supply units 9 and logic units 8 can be identically designed for the transmission modules 5 of different transmission units 1 and an adaptation to different requirements can take place only by exchange of the add-on modules 55 in the form of drive units 52 and/or of add-on modules in the form of the closing elements. In this case the platform transmission 50 forms the foundation for the structure of a transmission module from the combination of basic transmission module 5 and control and supply module 53.

From a further aspect of the invention the platform transmission 50 can also be designed in such a way that it comprises the basic transmission module 5.2, as well as a control and supply module 53, whereby this module is not necessarily to be understood as a modular unit, but rather as a multitude of individual elements that are more or less connected to each other. A case or case part 54 then also belongs to the basic transmission module, said case which can be designed in such a way that it can also hold a drive unit. The drive unit can be exchangeable at random. The only deciding factor is that the requirements be present on the part of the case 54 to also hold add-on module 55 in the form of the drive unit 53.

Figure 3A:
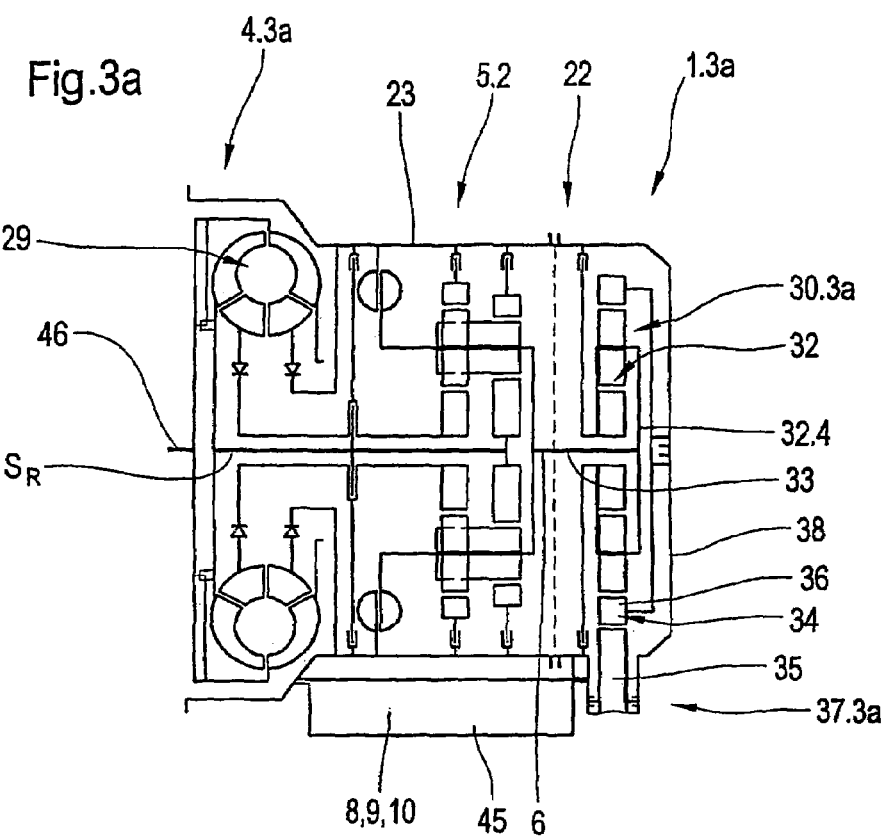
FIGS. 3a through 3e illustrates individual transmission designs with identical structure with regard to drive unit and basic transmission component and different closing units.

In the embodiment shown in FIG. 3a the total transmission modular unit 1.3a comprises along with platform transmission 50 from a basic transmission module 5.2 and integrated control and supply module 45 a hydrodynamic speed and torque converter 29 as drive unit 52 and an add-on module 56 rear-mounted step 30.3a in the form of a range-change unit comprising a planetary gear train 32, whose input 33 is connected with the output 6 of basic transmission module 5. The input is formed for example by bridge 32.4 of the planetary gear train 32. The outlet 34 of the transmission modular unit 1.3a is formed for example by a spur gear 35 arranged concentrically to the transmission axis of symmetry SR or to the central axis of planetary gear train 32 and a shaft coupled with said spur gear, whereby the spur gear 35 meshes with the output 34 of the planetary gear train 32. In this case the planetary gear train 32 acts as a rear-mounted range-change unit 30.3a, which by means of internal ring gear 32.3 and the spur gear 35 arranged concentrically to said internal ring gear formed spur gear train or the shaft coupled with this as 37.3a of the transmission modular unit 1.3 The integration of the rear-mounted range-change unit 30.3a and the output 37.3a takes place in a separate case part 38, which is combined with case 23 of the basic transmission module 5.3 into total transmission case 22. The case part 38 is free of logic units 8, supply units 9 and function units 10, which are combined in the control and supply module 45 and in the basic transmission module 5.2 or its case 23.

Figure 3B:
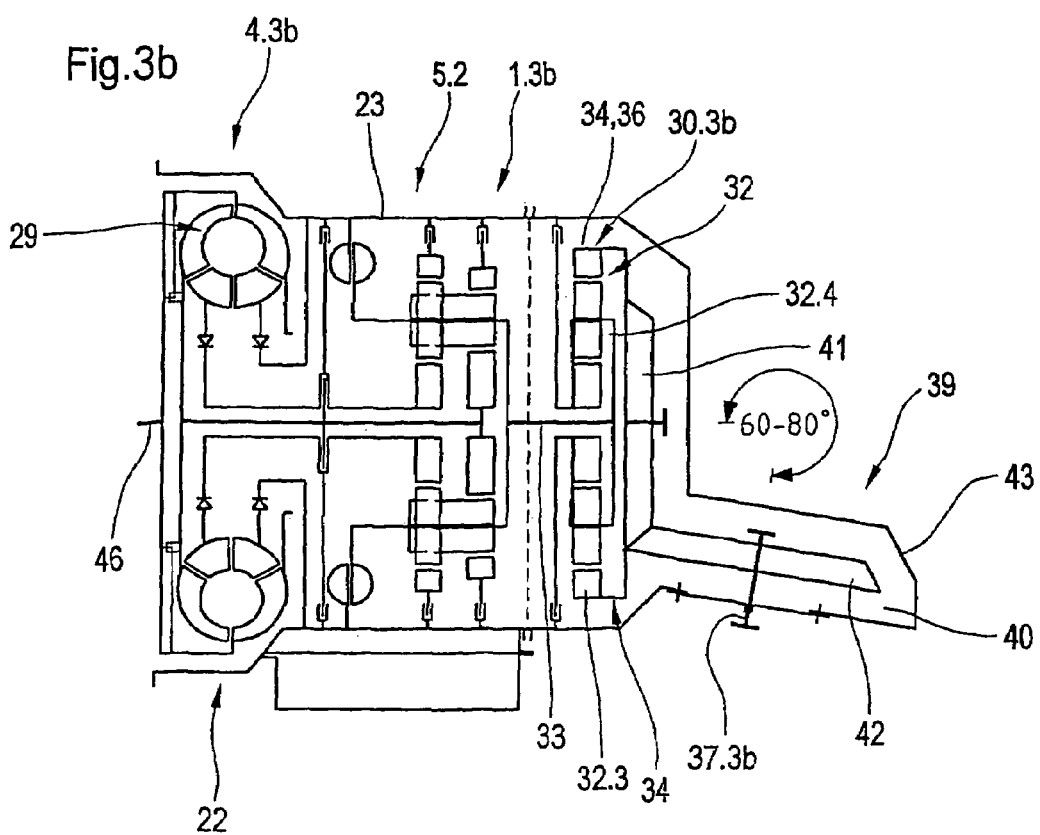

FIG. 3b illustrates a further possible design of a total transmission modular unit 1.3b from a platform transmission 50 made of basic transmission module 5.2 and an add-on module 55 in the form of a hydrodynamic transmission part 4.3b, in which the transmission outlet 39 is formed by an angle drive 40. The basic structure of hydrodynamic transmission part 4.3b and basic transmission module 5.2 corresponds to the one described in FIG. 3a or 2. With this transmission it is, depending on the control of the individual switch elements, a case of a model by means of which at least six speeds can be realized. For this purpose a rear-mounted step is also provided here, which with regard to its structure is identical to the one described in FIG. 30.3b. The same drawing references are used for the same elements. This is also designed as a planetary gear train whose inlet 33 is formed by bridge 32.4 of the planetary gear train and whose output or outlet is formed by internal ring gear 32.3. The outlet 36 is coupled with the angle drive 40. The angle drive 40 is designed as a bevel gear step comprising a first bevel gear 41, which is locked with the outlet 36 of the rear-mounted step 30.3b or 34 of planetary gear train 32, particularly with the internal ring gear 32.3 and which preferably forms a structural unit, and a second bevel gear 42, which is locked with the shaft 37.3b, which simultaneously forms the outlet of transmission modular unit 1.3a. Here too the rear-mounted step 30.3b and the angle drive 40 are integrated in a case part, here it is case part 43. The case part 43 forms the total transmission case 22 together with case 23 of the basic transmission module 5.2.

FIG. 3 illustrates a development of a total transmission structural unit 1.3c with a basic transmission module 5.2, an add-on transmission module in the form of a hydrodynamic transmission part 4.3c and an add-on transmission module 56 in the form of a rear-mounted range-change unit 30.3c, comprising a planetary gear train 32 similar to the models shown in FIGS. 3a and 3b, whereby however the drive 37.3c of the transmission modular unit 1.3c is coaxially arranged to the transmission inlet of the transmission modular unit 1.3c. In this case the output occurs without additional resources directly by the internal ring gear 32.3 of the planetary gear train 32, whereby the internal ring gear 32.3 for this purpose is coupled with a shaft, transmission outlet shaft 44. The transmission configuration shown in FIG. 3c can be executed corresponding to the control of the individual transmission elements in dependency on the control program as a 4-speed, 5-speed or 6-speed version with coaxial output 37.3c for transmission inlet shaft 46.

Figure 3C:
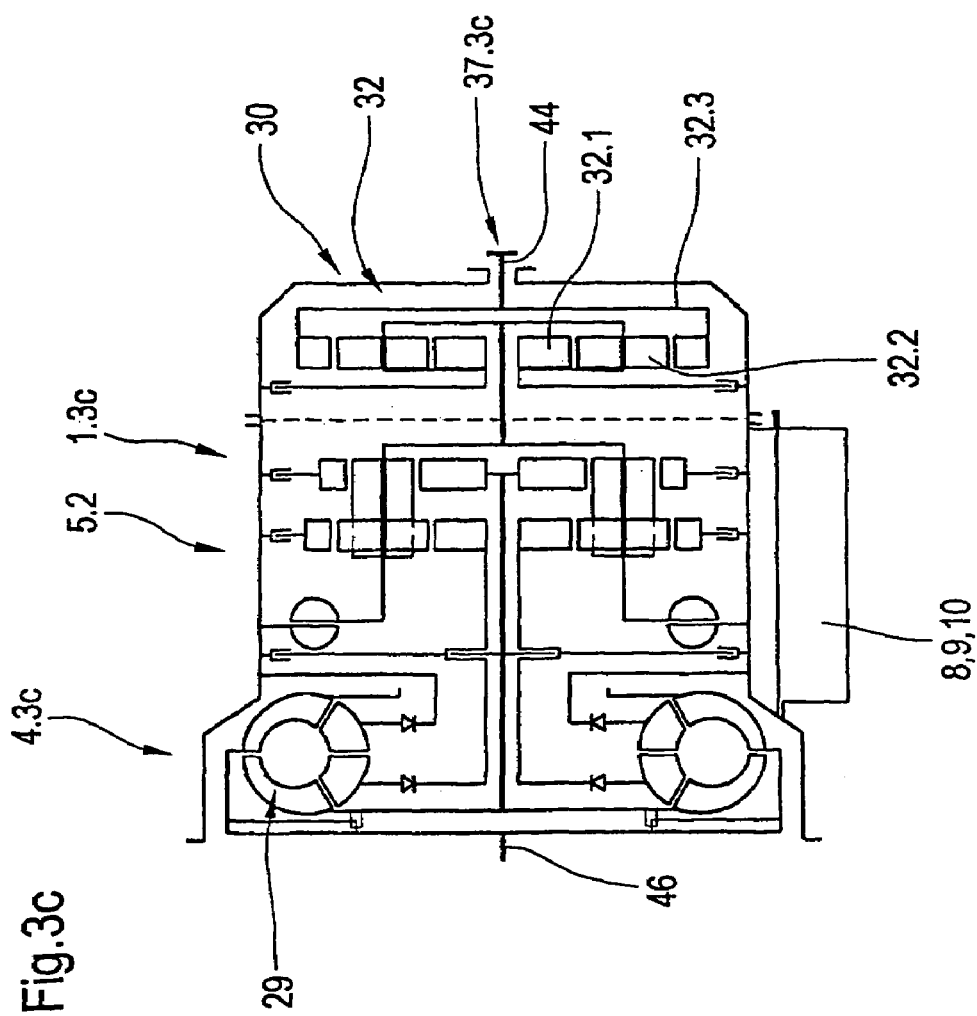
Figure 3D:
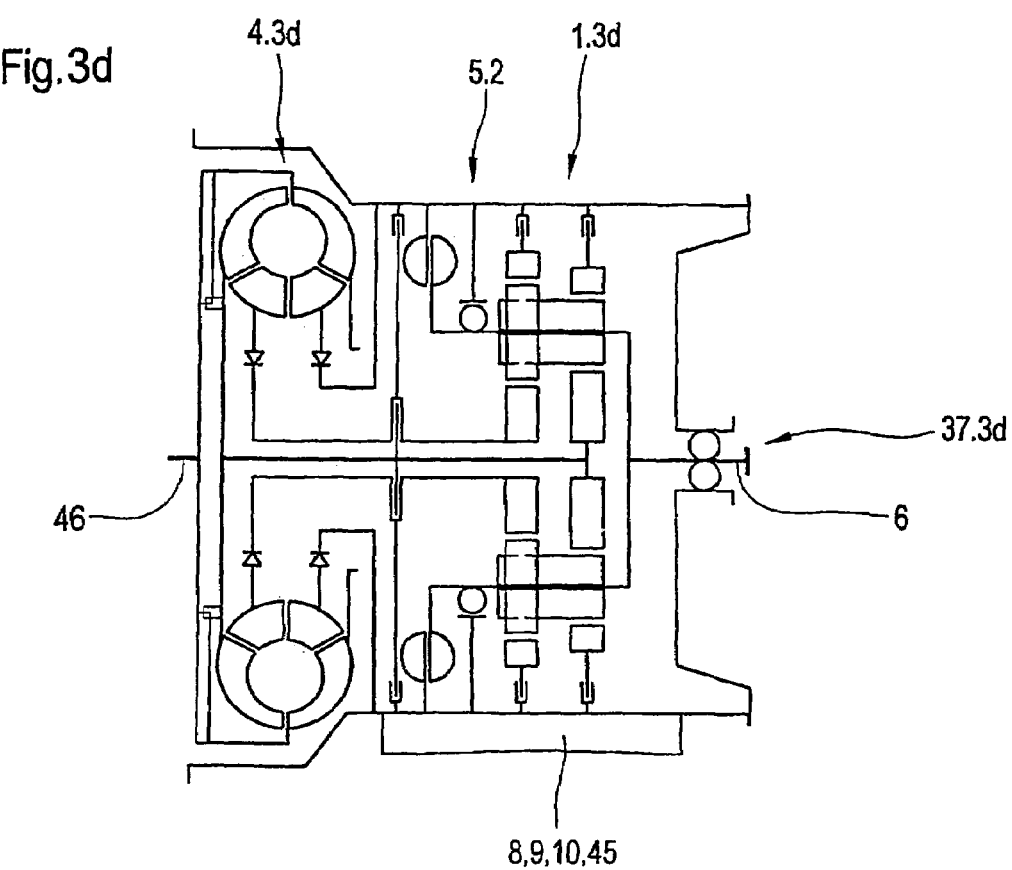

As opposed to that, FIG. 3d illustrates a total transmission modular unit 1.3d, which is designed as a 3-speed version and consists only of mechanical transmission parts of the basic transmission module 5.2 and the add-on module 55 in the form of drive unit 51, comprising a hydrodynamic transmission part 4.3d. The outlet 6 of the basic transmission module 5 forms simultaneously the output 37.3d or outlet of the total transmission modular unit 1.3d and is coaxially arranged to the transmission inlet shaft 46.

Figure 3E:
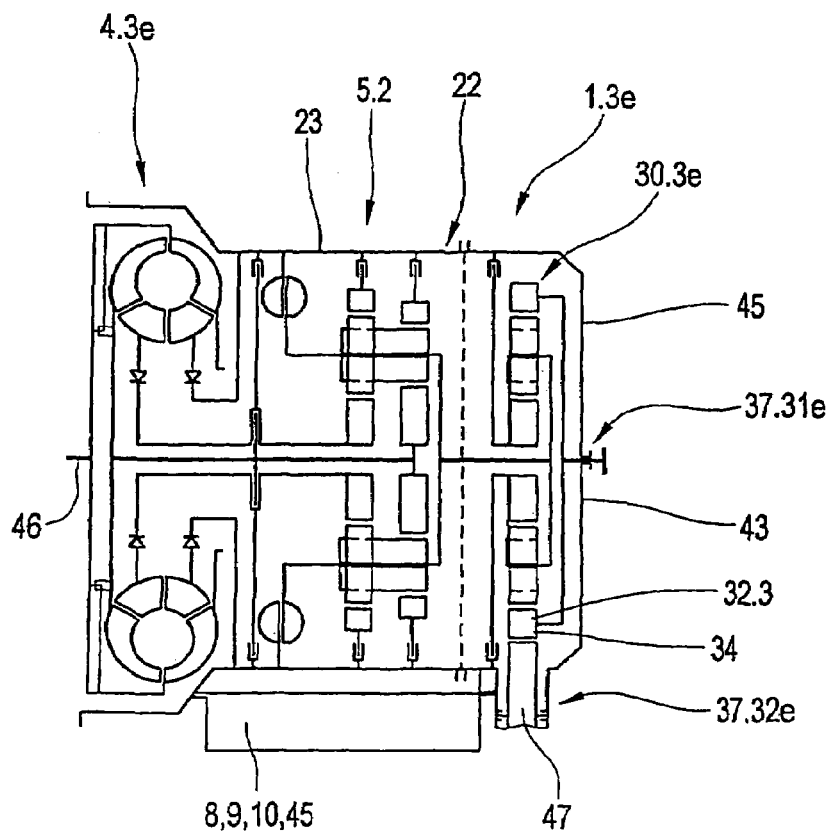

FIG. 3e illustrates a model of a total transmission modular unit 1.3e, comprising a basic transmission module 5.2, a hydrodynamic transmission part 4.3e and a further second add-on component 56, comprising a rear-mounted step 30.3e, which is preferably designed similar to the one in FIGS. 3a through 3c. The outlet 34 of the planetary gear train 32, which is formed by the tubular shaft 32.3, simultaneously acts as a first output 37.31e, whereby the output 37.31e is coaxially arranged to transmission inlet shaft 46, while a further second output 37.32e can be realized by a coupled with the internal ring gear 32.3, in the simplest case an additional spur gear 47. Here too rear-mounted step 30.3e and the corresponding outputs 37.31e, 37.32e are arranged in a separate case part in the form of a closing part 43, which can be combined with the case 23 of the basic transmission module 5.2 into a structural unit, the total transmission case 22.

FIGS. 3a through 3e illustrate possible designs of individual total transmission modular units of a transmission module with a high degree of standardization on the basis of the transmission modular system.

Further design options are also conceivable, and lie in the discretion of the responsible person skilled in the art. The designs portrayed in FIGS. 3a through 3e represent preferred designs which stand out regarding the function to be realized through a high degree of standardization, low component requirements as well as building space requirements. Different application possibilities result from these transmission structural units, which are reproduced in FIGS. 4 through 7.

The transmission configuration as per FIG. 3a is used for the following designs on the vehicle shown in FIGS. 4a through 4d. The design of a total transmission modular unit 1.3a as per FIG. 3a with central power take-off, i.e. arrangement of the output concentrically to the center line of the planetary gear train 32 of the rear-mounted step, is used preferably for transverse arrangements of the drive machine 48.4a, 48.4b, 48.4c in the vehicle. The total transmission modular unit 1.3a is coaxially arranged to the drive machine 48.4a. The output occurs as per the designs in FIGS. 4a through 4d in vertical direction for example on an axis or at a gear 49. The axle drive can either take place central to the central power take-off or offset. The coupling between the central power take-off and the axle occurs either via a bevel gear set, a tripod propeller shaft and a standard axle with vertical drive or via a spur gear train, a spur gear differential with homogeneous propeller shafts or tripod propeller shafts.

FIG. 4c illustrates a design of a drive system for bus drive with a transversely mounted drive machine 48.4c, a total transmission modular unit 1.3a, whereby the central power take-off occurs vertically, the axle however is driven centrally via a lateral output, for example a transmission with spur gears.

Figure 4D:
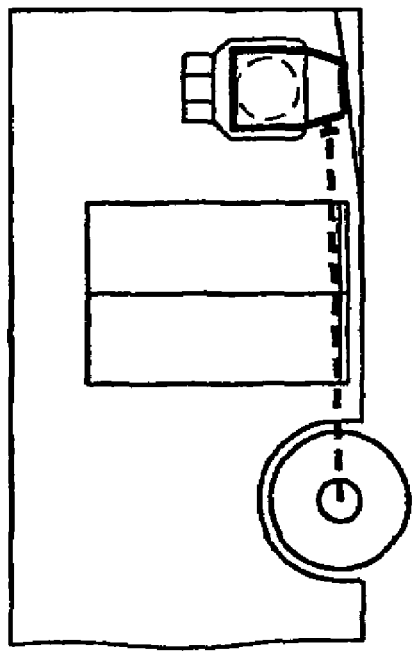
Figure 4D:
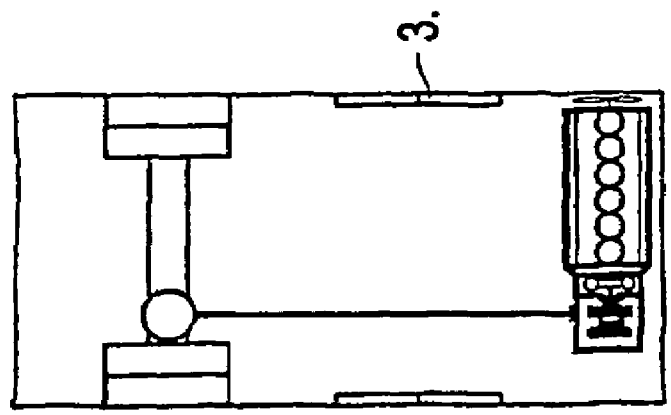

FIG. 4d illustrates a design similar to FIG. 4c, whereby however a portal axle is used as an axle.

Figure 5A:
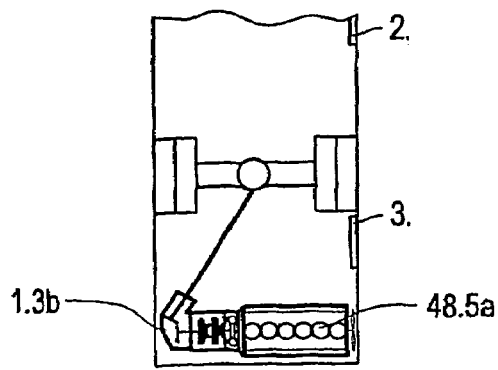
FIGS. 5a through 5d show in diagrammatically simplified representation examples of application for a transmission modular unit as per FIG. 3b.
Figure 5B:
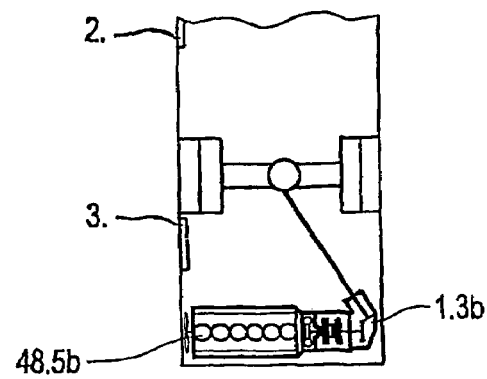
Figure 5C:
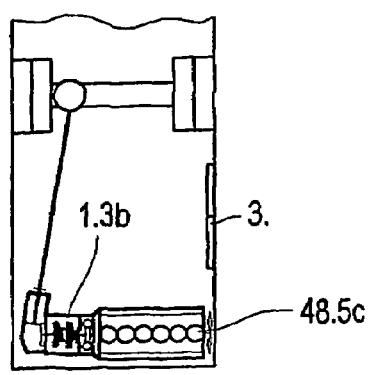
Figure 5D:
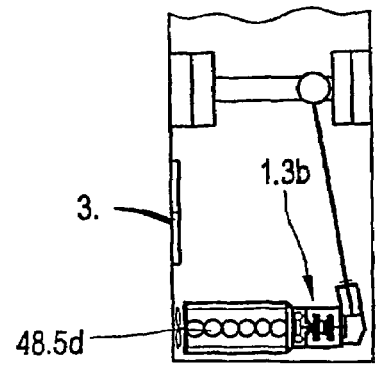

FIGS. 5a through 5d illustrate designs of drive systems for bus drives, in which the drive machine 48.5a through 48.5d is also in transverse arrangement. The transmission modular unit 1.3b is coaxially arranged to the drive machine 48.5a through 48.5d. The drive on the axle occurs by means of central coupling of the output of the total transmission modular unit 1.3b. For this purpose angle drives of 60 and 65° are used. FIG. 5a illustrates a design for right-hand traffic, while FIG. 5b makes possible a design for use in countries with left-hand traffic. FIGS. 5c and 5d illustrate similar designs for right-handed and left-handed traffic, whereby however the axle is designed as a portal axle and the low-floor drive occurs transversely and not centrally, but rather offset on the axle.

Figure 6C:
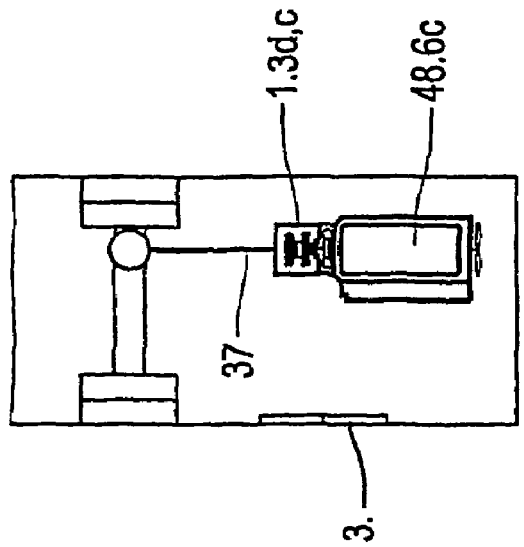
FIGS. 6a through 6c show in diagrammatically simplified representation designs of drive systems with transmission modular units as per FIGS. 3c and 3d.
Figure 6B:
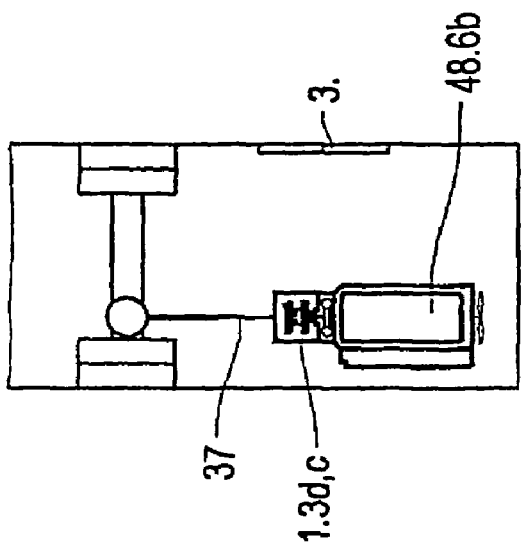
Figure 6A:
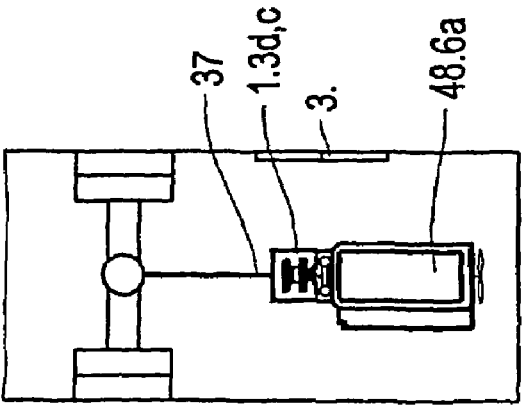

FIGS. 6a through 6c illustrate applications for total transmission designs as per FIGS. 3c and 3d. FIG. 6a shows in diagramatically simplified representation a standard bus drive, in which the arrangement of drive machine 48.6a as well as total transmission modular unit 1.3c or 1.3d occurs longitudinally to the direction of travel. The axle drive occurs essentially in the area of the center of the axle, whereby the output 37 also is coupled in longitudinal direction of the axle. FIG. 6b illustrates a design as per FIG. 6a, whereby however the axle drive does not occur centrally, but rather offset for a portal axle. Both designs are suitable for right-handed traffic, whereby the design as per FIG. 6a is also suitable for left-handed traffic. To achieve a suitability for left-handed traffic with designs with portal axle an application as per FIG. 6c is required on the portal axle. This clearly shows that the connection to the portal axle always takes place on the side of the axle which is the furthest away from the doors of the vehicle.

FIG. 7 illustrates a possible application of a total transmission design as per FIG. 3d using a lateral view of a vehicle. This is especially suitable for all-wheel drive, whereby the arrangement of the combustion power machine 48.7 and the transmission modular unit occurs in longitudinal direction of the vehicle and the drive is realized centrally on the axles.

LIST OF REFERENCE SYMBOLS

| | |
|---|---|
| 1, 1.2, 1.3 1.3b, 1.3c, 1.3d | Total transmission modular unit |
| 2 | Compound transmission |
| 3, 3.2, 3.3a 3.3b, 3.3c, 3.3d | Mechanical transmission part |
| 4, 4.2, 4.3a, 4.3b, 4.3c, 4.3d | Hydrodynamic transmission part |
| 5, 5.2 | Basic transmission component |
| 6, 6.2 | Outlet |
| 7, 7.2 | Transmission outlet |
| 8, 8.2 | Logic unit |
| 9, 9.2 | Control and supply unit |
| 10, 10.2 | Function unit |
| 11 | Outer periphery of the power-transferring elements |
| 12 | Control device |
| 13 | Controller |
| 14 | Hydraulic control device |
| 15 | Electronic control device |
| 16 | Electronic controller |
| 17 | Carrier plate |
| 18 | Controller case |
| 19 | Pump device |
| 20 | Filter device |
| 21 | Heat exchanger |
| 22 | Transmission case |
| 23 | Case of the body transmission |
| 24 | Planetary gear train |
| 24.1 | Sun gear |
| 24.2 | Planetary gears |
| 24.3 | Internal ring gear |

-continued

| | |
|---|---|
| 25 | Planetary gear train |
| 25.1 | Sun gear |
| 25.2 | Planetary gears |
| 25.3 | Internal ring gear |
| 26 | Bridge |
| 27 | Shaft |
| 28 | Shaft |
| 29 | Hydrodynamic speed/torque converter |
| 30.3a, 30.3b, 30.3c, 30.3d | Rear-mounted step |
| 31 | Output unit |
| 32 | Planetary gear train |
| 32.1 | Sun gear |
| 32.2 | Planetary gears |
| 32.3 | Internal ring gear |
| 32.4 | Bridge |
| 33 | Inlet of the planetary gear train 32 |
| 34 | Outlet of the planetary gear train 32 |
| 35 | Spur gear |
| 36 | Output |
| 37 | Output |
| 38 | Case part |
| 39 | Transmission outlet |
| 40 | Angle drive |
| 41 | First bevel gear |
| 42 | Second bevel gear |
| 43 | Closing part, case part |
| 44 | Case outlet shaft |
| 45 | Control and supply module |
| 46 | Transmission inlet |
| 47 | Spur gear |
| 48.4a, 48.4b 48.4c, 48.4d | Drive machine |
| 48.5a, 48.5b 48.5c, 48.5d 48.6a, 48.6b 48.6c, 48.6d | |
| 50 | Platform transmission |
| 51 | Drive unit |
| 52 | Basic transmission |
| 53 | Logic an control or supply module |
| 54 | Case part |
| 55, 56 | Add-on module |
| $S_G$ | Transmission axis of symmetry |

The invention claimed is:

1. A transmission modular system for creating a plurality of modified transmission modular units for different purposes with a transmission inlet and a transmission outlet, comprising:

a mechanical transmission part comprising power-transferring elements, which is arranged in a case part and forms with these a basic transmission component, which comprises at least an inlet and an outlet;

a logic unit, which is integrated in the basic transmission component underneath the theoretical connection line between the inlet and outlet or is flanged on the case part;

a control and supply unit which is integrated in the basic transmission component and the supply unit comprises components of at least one of an operating fluid, a control fluid and a lubricant system, delivery devices, devices for storage and function units for influencing the at least one of the operating fluid, control fluid and lubricant supply, and add-on elements, including one or more of: a heat exchanger, filters, pumps, and valves;

the logic unit comprising sensors, electronic control devices and actuators;

an arrangement of the logic unit and control and supply units occurs underneath the power-transferring elements of the basic transmission module;

the logic and control and supply units are consolidated into a combined logic-control and supply module;

the basic transmission module being combined with an add-on module, which comprises a drive unit, whereby the drive unit is superposed on the mechanical transmission part and is arranged in the case of the basic transmission component.

2. The transmission modular system according to claim 1, wherein the arrangement of the logic and control and supply units in the basic transmission component occurs at a specified minimum distance to an outer circumference of the power-transferring transmission elements underneath a theoretical connection axis between the inlet and the outlet of the basic transmission component and underneath the power-transferring transmission elements.

3. The transmission modular system according to claim 1, wherein the arrangement of the logic and control and supply units is in the area of the height of the volume of an adjustable operating fluid sump in the case part of the basic transmission module.

4. The transmission modular system according to claim 1, wherein the drive unit and the basic transmission component are flanged onto each other.

5. The transmission modular system according to claim 1, wherein the basic transmission module can be coupled with a further second add-on module, which comprises a closing unit.

6. The transmission modular system according to claim 5, wherein the closing unit that can be coupled with the basic transmission module comprises a further case part element which can be connected with the case part of the basic transmission component.

7. The transmission modular system according to claim 6, wherein the closing unit is designed as a transmission case cover.

8. The transmission modular system according to claim 6, wherein the closing unit comprises a rear-mounted step or a continuously variable transmission part, which is coupled with an outlet of the basic transmission module and forms the transmission outlet of the respective transmission modular unit and is enclosed by the case part element of the closing unit.

9. The transmission modular system according to claim 8, wherein the rear-mounted step is formed by a range-change unit.

10. The transmission module according to claim 5, wherein the closing unit comprises an angle drive.

11. The transmission modular system according to claim 1, wherein the drive unit comprises a drive element which is designed as a hydrodynamic clutch or hydrodynamic speed/torque converter.

12. The transmission module according claim 2 with a common modular unit based on a plurality of total transmission units in the form of a platform transmission, comprising a basic transmission module and a logic, control and supply module integrated into said basic transmission module.

13. The transmission module according to claim 1, wherein:

the mechanical transmission part comprises two planetary gear trains with a sun gear, internal ring gear, planetary gears and a bridge;

the bridges of both planetary gear trains are coupled with each other;

the sun gears of the planetary gear trains are coupled with the inlet of the basic transmission component.

14. The transmission modular system according to claim 2, wherein the arrangement of the logic and control and supply units is in the area of the height of the volume of an adjustable operating fluid sump in the case part of the basic transmission module.

15. The transmission modular system according to claim 2, wherein the drive unit and the basic transmission component are flanged onto each other.

16. The transmission modular system according to claim 3, wherein the drive unit and the basic transmission component are flanged onto each other.

17. The transmission modular system according to claim 2, wherein the basic transmission module can be combined with a further second add-on module, which comprises a closing unit.

18. The transmission modular system according to claim 3, wherein the basic transmission module can be combined with a further second add-on module, which comprises a closing unit.

19. The transmission modular system according to claim 4, wherein the basic transmission module can be combined with a further second add-on module, which comprises a closing unit.

* * * * *

UNITED STATES PATENT AND TRADEMARK OFFICE
CERTIFICATE OF CORRECTION

| | | |
|---|---|---|
| PATENT NO. | : 7,131,929 B2 | Page 1 of 1 |
| APPLICATION NO. | : 10/477287 | |
| DATED | : November 7, 2006 | |
| INVENTOR(S) | : Tillman Körner et al. | |

It is certified that error appears in the above-identified patent and that said Letters Patent is hereby corrected as shown below:

On The Title Page: Item
(75) Inventors: Delete "Tillman Kömer" and insert --Tillman Körner--

Delete "Alexander Kömer" and insert --Alexander Körner--

Signed and Sealed this

Thirteenth Day of February, 2007

JON W. DUDAS
*Director of the United States Patent and Trademark Office*